Figure 3A:
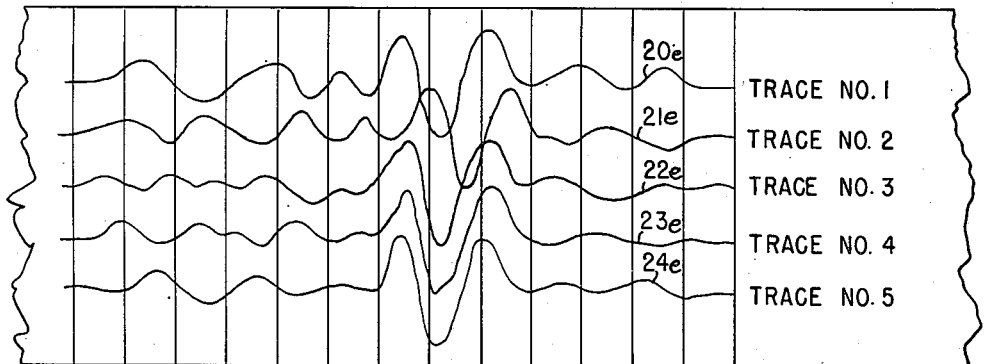

Dec. 11, 1951  J. E. HAWKINS  2,578,133
SYSTEM OF SEISMIC RECORDING
Filed Nov. 8, 1944  3 Sheets-Sheet 1
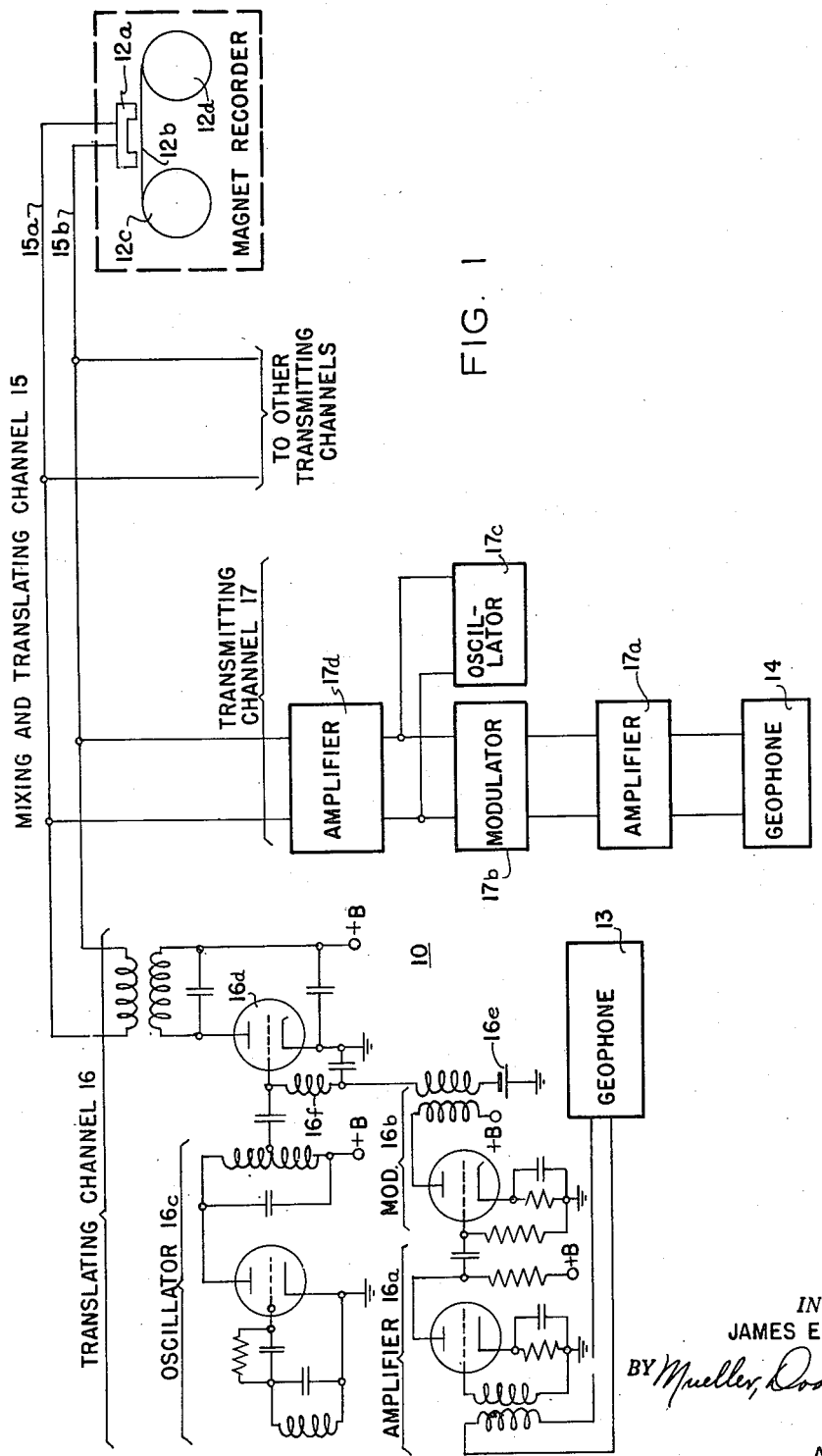
INVENTOR.
JAMES E. HAWKINS
BY Mueller, Dodds & Mason
ATTORNEYS

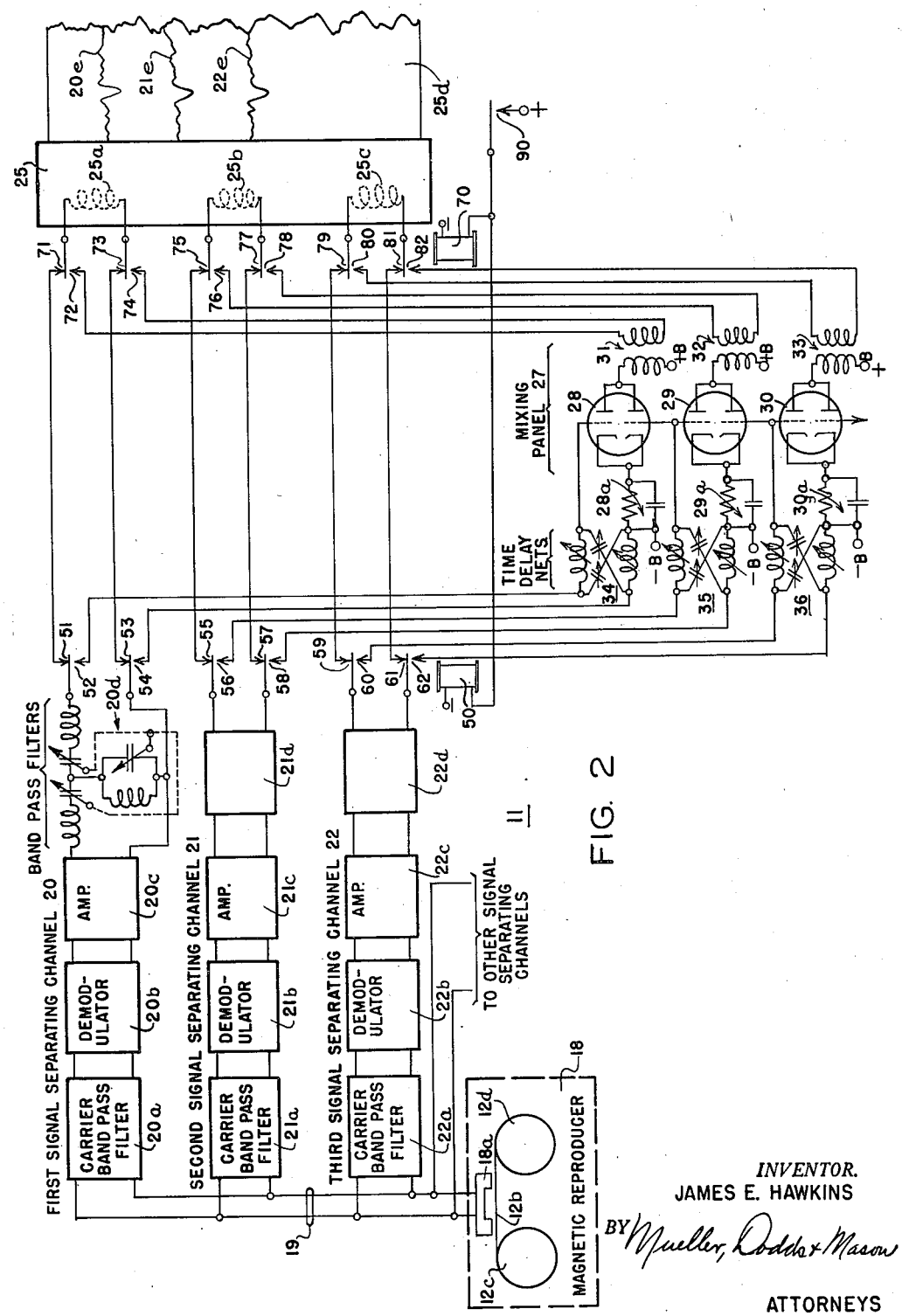

Dec. 11, 1951     J. E. HAWKINS     2,578,133

SYSTEM OF SEISMIC RECORDING

Filed Nov. 8, 1944     3 Sheets-Sheet 3

INVENTOR.
JAMES E. HAWKINS
BY Mueller, Dodds & Mason

ATTORNEYS

Patented Dec. 11, 1951

2,578,133

UNITED STATES PATENT OFFICE 2,578,133

SYSTEM OF SEISMIC RECORDING

James E. Hawkins, Tulsa, Okla., assignor, by mesne assignments, to Seismograph Service Corporation, Tulsa, Okla., a corporation of Delaware Application November 8, 1944, Serial No. 562,552

9 Claims. (Cl. 346—33)

The present invention relates to improvements in systems for recording and analyzing seismic signals and more particularly to improved methods and apparatus for facilitating the recording and interpretation of the seismic signals generated by a single, shot engendered, earth disturbing impulse.

In seismic prospecting as generally practiced in the art, the earth waves generated by each earth disturbing impulse or shot are picked up as separate signals at various points within the area under survey, and the different signals are transmitted over separate two wire channels to different elements of a seismic recording camera to be recorded upon a common film. The usual seismic signal, as picked up and recorded in this manner, contains a wide variety of frequency components, only certain bands of which will, when analyzed in the absence of other components, give the desired information. Thus, the usual seismic signal is picked up in the presence of wind and ground noise components which are mixed with the desired signal frequency components to distort the recorded signal. Specifically, the mixed signal and noise energy of a given signal may, for example, be made up of reflected wave train frequency components ranging from 40 to 50 cycles per second, "ground roll" noise components having frequencies ranging from 10 to 20 cycles per second, and wind noises having frequencies from 100 to 200 cycles per second. Filtering may be resorted to in suppressing the undesired frequency components at a point in each signal channel between the signal pickup device and the recording camera, so that only the desired frequency components are actually recorded. This raises the problem of accurately preselecting the desired signal frequency band before the earth disturbing impulse is generated to produce the signal record. Unfortunately, the desired frequency bands, i. e. the bands containing the wanted signal frequency components, are not the same and are entirely unpredictable as between different geographic locations. For a given location, therefore, conventional practice dictates a trial and error method of ascertaining the desired frequency band. With conventional systems, this procedure involves taking a plurality of shots, recording the signals generated at each shot and making filter adjustments between successive shots in an attempt to locate the desired frequency band. Not only is this procedure wasteful of explosives and film, but more important it is inaccurate. Thus, to maintain proper accuracy in the relationship between the successively recorded signals, the same shot hole should be used in exploding the several charges. However, each shot or explosion causes earth shattering in the vicinity of the shot hole which causes changes in the characteristics of the successively generated earth impulses. Maintenance of uniform conditions in generating the ground impulses is, therefore, substantially impossible. This problem is also of importance in the production of so-called mixed trace records which are obtained by mixing the components of different pairs of signals and recording the resultant signals to thereby emphasize the ratio of reflected energy to other energy. Another problem involved in the production of reliable mixed trace records is that of obviating the effects of erratic differences in reflection times, occasioned by differences in weathering delay times and elevational differences at the separated signal pickup points, in order to obtain proper emphasis between the reflection energy and other energy. Conventional seismic recording systems also require the use of individual cables or a single multi-conductor cable of four or more wires to interconnect the recording camera with the signal pickup devices. Since the distances separating the pickup points from each other and from the recording camera may be considerable, such a wiring arrangement is relatively expensive and rather difficult to handle in the field.

It is an object of the present invention, therefore, to provide an improved seismic recording system wherein at least a part of the above-mentioned difficulties are obviated.

It is another object of the present invention to provide an improved method of seismic recording which specifically obviates the signal band selecting difficulties outlined above.

According to a further object of the invention, an improved method of seismic signal recording is provided which permits electrical band by band analysis of the signal frequency components of one or more signals generated by a single earth impulse and also permits permanent pictorial recording of the signal frequency components within any selected frequency band.

In accordance with still another and more specific object of the invention, the recording of the desired frequency components of the selected signal or signals is carried out in a plurality of successive recording steps, the first of which provides for recording of all frequency components of the signal or signals which are picked up, and also provides for repeated electrical reproduction of the signal or signals for purposes of analysis and frequency band selection.

It is yet another object of the invention to provide an improved seismic recording method of the character described which may be readily used in the production of mixed signal record traces without requiring additional shots for this specific purpose.

According to a still further object of the invention, the trace distortion effects involved in the production of mixed signal traces and caused by erratic differences in individual signal reflection times which in turn are occasioned by differences in weathering delay times and differences in elevation at the different signal pickup points, are minimized by appropriately delaying the recording of certain of the signals involved in the production of the mixed signal record.

It is another object of the present invention to provide an improved and highly effective method of compositely recording a plurality of seismic signals upon a common recording medium from which the signals may be easily and repeatedly resolved or reproduced without distortion of the phase relationships originally existent between the signals.

It is a further object of the invention to provide improved apparatus capable of being used to practice the present improved methods.

According to another and more specific object of the invention improved apparatus is provided for compositely recording a plurality of phase related signals upon a common magnetizable medium and for reproducing selected frequency components of the signals without distortion of the phase relationship therebetween.

Figure 3B:
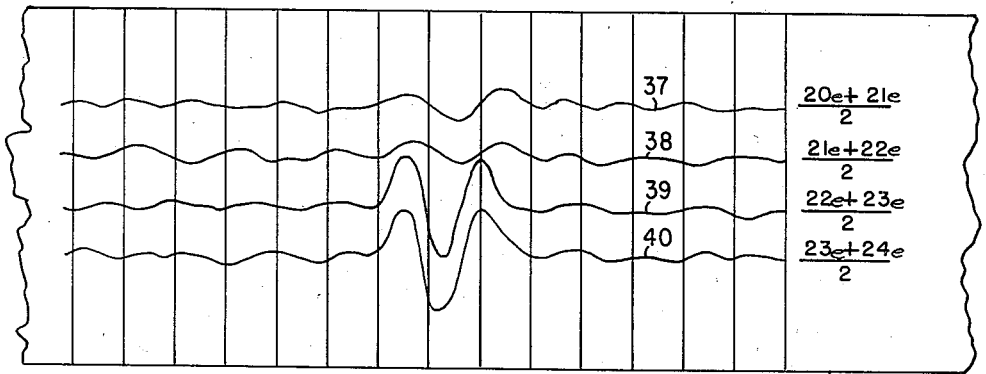
Figure 3C:
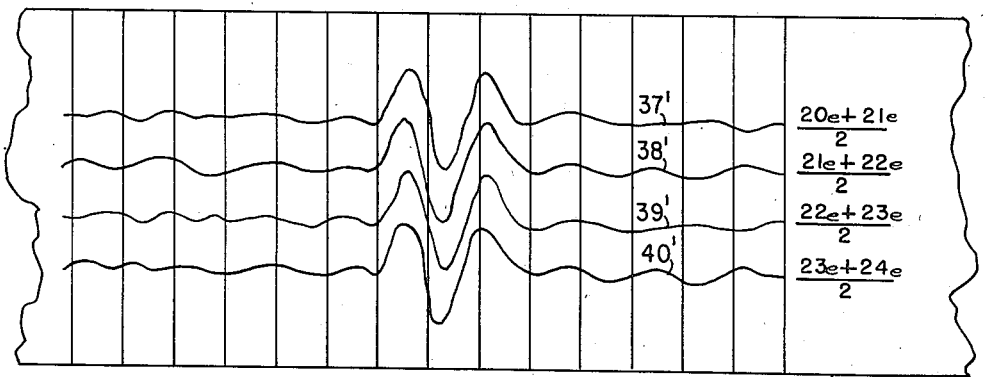

The invention, both as to its organization and method of operation, together with further objects and advantages thereof, will best be understood by reference to the following specification taken in connection with accompanying drawings, in which:

Fig. 1 schematically illustrates improved apparatus embodied in the present improved system to pick up and produce a composite record of a plurality of seismic signals generated by a single earth disturbance;

Fig. 2 illustrates improved apparatus embodied in the system to reproduce and resolve the composite signal back into its component parts and to pictorially record the signals either separately or in various combinations; and Figs. 3A, 3B and 3C respectively illustrate the pictorial records which are produced under different conditions of operation of the apparatus shown in Fig. 2 of the drawings.

Referring now to the drawings and more particularly to Fig. 1 thereof, the improved signal pickup and composite signal recording apparatus is there indicated generally at 10 as comprising a magnetic recorder 12 having a recording head 12a coupled or connected to a mixing and translating channel 15 and adapted to record signals received over this channel upon a magnetizable medium in the form of a wire 12b, which is fed from a feed reel 12c through the field of the head 12a to a takeup reel 12d. This recorder may be of any desired commercial type although preferably is of the improved wide range type disclosed in Camras Patent No. 2,351,005, issued June 13, 1944, and having a recording range in excess of 50,000 cycles per second when operated at full speed. The mixing channel 15 is comprised of only two conductors 15a and 15b which extend as a cable from the recording point at which the magnetic recorder 12 is located to transmitting channels 16, 17, etc., individually provided at the different points of signal pickup. The identified transmitting channels are of identical arrangement. Specifically, the channel 16 comprises a signal pickup device in the form of a geophone 13 of any desired commercial construction arranged to feed signal energy through an amplifier stage 16a into a modulator stage 16b, the output of which is mixed with the carrier output of an oscillator 16c at the input side of an amplifier 16d. At the output side of the amplifier 16d, the signal modulated carrier energy is delivered to the mixing channel 15 for transmission to the recording head 12a of the recorder 12, through a frequency selective circuit tuned to the particular carrier frequency of the oscillator 16. Similarly, the transmitting channel 17 comprises a signal pickup device 14, an amplifier 17a, a modulator 17b and an amplifier 17d connected in tandem in the order named, with a carrier producing oscillator 17c being provided at the input side of the amplifier 17d to convert the low frequency signal energy picked up by the pickup device 14 into carrier frequency energy modulated at the signal frequency rates. At this point it is noted that the amplifiers 16d, 17d, etc., individual to the various transmitting channels and commonly coupled to the mixing channel 15, serve to prevent interaction between the carrier producing oscillator 16c, 17c, etc., which might result in spurious operation of these oscillators at frequencies other than those for which they are designed. The stages 16a, 16b, 16c and 16d of the transmitting channel 16 may be of substantially conventional circuit arrangement, and accordingly the component parts thereof have not been specifically identified in the drawings. It is noted, however, that the oscillator 16c is of the well known electron coupled type employing interelectrode coupling within the tube thereof to sustain its operation at its rated carrier frequency; that the amplifier 16a is resistance coupled to the modulator 16b; and that the signal voltage appearing at the output side of the modulator 16b is impressed across the input electrodes of the amplifier 16d in parallel with the output voltage from the oscillator 16c over a coupling path which includes a C biasing battery 16e and a carrier frequency choke inductance 16f. It is noted further that the oscillators 16c, 17c, etc., individual to the various transmitting channels, have output frequencies which are sufficiently widely separated to permit easy separation thereof after being mixed together and compositely recorded upon the recording wire 12b of the recorder 12. Thus, and depending upon the number of transmitting channels used, the output carrier frequencies of the oscillators 16c, 17c, etc., may have a frequency separation of the order of 1,000 to 5,000 cycles or more without exceeding the recording range of the magnetic recorder 12.

Referring now more particularly to Fig. 2 of the drawings, the reproducing and signal resolving apparatus of the system is there indicated generally at 11 as comprising a magnetic reproducer 18 having a reproducing head 18a in which the composite signal recorded upon the wire 12b is picked up for transmission to a plurality of signal separating channels 20, 21, 22, etc., over a common channel 19. In the identified separating channels, the carriers and the signals respectively modulated thereon are separated one from the other, demodulated and amplified for transmission to the mirror driving elements 25a, 25b, 25c, etc. of a seismic recording camera 25, either directly or through a mixing panel 27 in the manner more fully explained below. The seismic recording camera 25 may be of any desired commercial type having the required number of recording elements and preferably is provided with facilities for visually inspecting signals impressed upon the mirror driving elements 25a, 25b, 25c, etc., as well as recording such signals upon a common film 25d which is driven at a known synchronous speed. More specifically, the first signal separating channel 20 comprises a carrier band pass filter 20a which may be tuned to pass the carrier and signal frequency components appearing at the output side of the transmitting channel 16, for example, a demodulator 20b for detecting the signal frequency components of the signal modulated carrier, an amplifier 20c for amplifying the detected signals, and a low frequency band pass filter 20d for selecting particular frequency components of the amplified signals and for transmitting the same either to the driving element 25a of the recording camera or to the mixing panel 27. This filter is of the well known T-type, being provided with adjustable series and shunt condensers which are mechanically arranged for uni-control operation to vary the pass band characteristic of the filter without distorting the phase relationship between the passed signal components. The second signal separating channel 21 similarly comprises a carrier band pass filter 21a, a demodulator 21b, an amplifier 21c and an adjustable low frequency band pass filter 21d connected in tandem in the order named. This separating channel may be utilized to select from the composite signal, the signal modulated carrier produced in the transmitting channel 17 and to resolve the signal frequency components from the carrier for transmission either to the driving element 25b of the seismic recording camera 25 or to the mixing panel 27. Cascade connected stages 22a, 22b, 22c and 22d are similarly provided in the third signal separating channel 22 for the purpose of selecting from the reproduced composite signal the signal modulated carrier appearing at the output side of the third transmitting channel and for resolving the signal components from the carrier for transmission either to the driving element 25c of the camera 25 or the mixing panel 27.

As will be evident from the foregoing explanation, the signal components respectively appearing at the output sides of the separating channels 20, 21 and 22 may either be transmitted directly to the recording camera 25 for separate observation or recording upon the film 25d of this camera, or may be transmitted to the mixing panel 27 for inter-mixture in a predetermined order following which the mixed signals may be transmitted from the output side of this mixing panel to the recording elements of the camera 25 for observation or recording of the resultant signals. For the purpose of selectively directing the signals appearing at the output terminals of the separating channels 20, 21, 22, etc., either directly to the camera 25 or to the mixing panel 27, switching means are provided which include a pair of switching relays 50 and 70 arranged for selective energization under the control of a switching key 90 of the well known locking type. Electronic mixing is employed in the mixing panel 27 for the purpose of inter-mixing the signals in the desired order. Specifically this panel comprises a plurality of mixing tubes 28, 29, 30, etc., one of which is provided for each pair of signals to be mixed and each of which is of the twin triode type. These tubes are arranged to deliver their mixed outputs respectively to the driving elements 25a, 25b and 25c of the recording camera 25 through coupling transformers 31, 32 and 33. They are respectively provided with associated cathode biasing network 28a, 29a and 30a having the function of maintaining the proper potential relationships between the cathodes and grids thereof. As explained more in detail below, under certain circumstances and in order to obtain the proper time relationship between certain of the signals which are mixed within the mixing panel 27, it is necessary to alter the time relationship between the different signals before they are introduced into the mixing panel. To this end time delay networks 34, 35 and 36 are provided ahead of the tubes 28, 29 and 30 in individual association with the signal separating channels 20, 21 and 22 to delay transmission of the signal components from these channels to the tubes of the mixing panel. These networks are of the well known series shunt type, function substantially uniformly to delay signal components of all frequencies within the range for which they are designed, and preferably are provided with adjustable circuit components in order to vary the delay intervals as desired. Specifically, these networks may be of the character analyzed by C. E. Lane in an article, Phase distortion in telephone apparatus, appearing in the Bell System Technical Journal, July 1930, volume 9, No. 3.

In considering the operation of the apparatus illustrated in Fig. 1 of the drawings to compositely record a plurality of seismic signals, it will be understood that in utilizing this apparatus to obtain data from which the geophysical structure at a particular location may be ascertained, the signal pickup devices, i. e., the geophones 13, 14, etc., are placed at selected separated points within the area of survey, and that the various transmitting channels 16, 17, etc., are connected with the recording head 12a of the magnetic recorder 12 over the two conductors of the mixing and translating channel 15. After the signal pickup devices have thus been properly located, a shot is exploded at a selected point remote from the respective signal pickup points. As a result, waves are engendered in the earth within the area of survey and are reflected to the earth's surface in accordance with a predetermined time pattern indicative of the geophysical structure under survey, where they are separately collected by the spaced apart signal pickup devices. The reflected ground waves are of necessity collected by the signal pickup devices in the presence of noise signals of the same and different frequencies which have their origin in different sources. For example, the low frequency, high amplitude surface propagated seismic wave generated by the shot itself and commonly referred to as "ground roll," is transmitted through the earth for collection by the signal pickup devices in the presence of the reflected shot-engendered ground waves. Wind noises having frequency components usually in excess of 100 cycles per second also commonly accompany the collection of the desired reflected ground waves by the signal pickup devices. High frequency noise interference may also be generated by the shot itself, in the form "hole chatter" which is caused by material being blown out of the shot hole and vibration of the hard strata near the hole. The mixed signal energy as made up of the desired and undesired frequency components and as collected at the location points of the different signal pickup devices, is separately modulated upon the carriers respectively produced by the oscillators 16c, 17c, etc., following which the signal modulated carriers are transmitted through the amplifier 16d, 17d, etc., to the mixing and translating channel 15. In this channel, the composite signal is formed and transmitted to the recording head 12a for magnetic recording upon the common magnetizable wire 12b which is travelling between the feed spool 12c and the take-up spool 12d of the recorder. More specifically, the signal collected by the geophone 13 is amplified through the amplifier and modulator stages 16a and 16b, modulated upon the carrier produced by the oscillator 16c at the output side of the modulator 16b, and transmitted through the amplifier 16d with a resultant signal amplitude gain to the channel 15 for mixing with the modulated carrier outputs of the other transmitting channels. In this regard it is noted that the fixed tuned circuit provided at the output side of the amplifier 16d is center-tuned to the carrier frequency produced by the oscillator 16c and is characterized by a band pass characteristic such that it is capable of passing to the channel 15 without distortion any and all components of the signal energy collected by the geophone 13. Since the collection of the signals occurs concurrently at the different points of collection, i. e., at the points of location of the individual pickup devices, it will be understood that the modulated carriers appearing at the output sides of the respective transmitting channels are mixed in the mixing channel 15 and recorded upon the wire 12b of the recorder 12 without any appreciable distortion or change in the phase relationship between the frequency components of the separately collected signals.

After a composite record has thus been made of the signals generated by a single earth disturbing impulse, the signal frequency components of the composite signal may be resolved for a variety of different purposes by utilizing the reproducing apparatus illustrated in Fig. 2 of the drawings. To this end, the wire 12b upon which the composite signal is magnetically recorded is run through the pickup field of the reproducing head 18a to cause reproduction of the composite signal as a high-frequency voltage between the conductors of the channel 19. From this channel the individual signal modulated carriers are separately transmitted through the separating channels 20, 21, 22, etc., for resolution. Thus the signal modulated carrier produced by modulating the signal collected by the pickup device 13 upon the carrier produced by the oscillator 16c within the transmitting channel 16 may be passed only by the carrier filter 20a provided in the first signal separating channel 20. Again, the selective characteristics of the carrier filter 21a provided in the second signal separating channel 21 may be such as to pass to the demodulator 21b only the signal modulated carrier appearing at the output side of the transmitting channel 17 during the composite signal recording step described above. The signal modulated carrier which is thus caused to appear at the output side of the filter 20a is passed to the demodulator 20b wherein the signal frequency components are detected in an entirely conventional manner. Following this operation, the signal voltage is amplified through the amplifier 20c and impressed upon the input terminals of the band pass filter 20d. In an entirely similar manner, the signal frequency components of the carriers respectively passed by the filters 21a, 22a, etc., provided in the other separating channels are demodulated, amplified and impressed upon the input terminals of the band pass filters 21d, 22d, etc.

The purpose of providing the identified low-frequency band pass filters 20d, 21d, 22d, etc., is explained more fully below. For the present it is noted that the signal voltages appearing at the output terminals of the respective filters are either transmitted directly to the camera 25 for inspection or recording, or are transmitted through the time delay networks 34, 35 and 36 and the mixing panel 27 to the camera 25, depending upon the setting of the switch 90. Thus if this switch occupies its illustrated normal position, the two switching relays 50 and 70 are deenergized so that circuits are established through the odd-numbered contacts thereof for impressing the signal voltages appearing across the output terminals of the filters 20d, 21d, and 22d, respectively, across the driving elements 25a, 25b and 25c of the camera 25. On the other hand, if the switch 90 is operated to its closed circuit setting, the relays 50 and 70 are energized in obvious circuits to open their odd-numbered contacts and close their even-numbered contacts, whereby the output terminals of the filters 20d, 21d and 22d are respectively connected through the time delay networks 34, 35 and 36 to the mixing panel 27, and the output terminals of the mixing panel are respectively connected to the mirror-actuating coils 25a, 25b and 25c of the recording camera 25. It will thus be apparent that through selective manipulation of the switch 90 the signals respectively appearing at the output sides of the filters 20d, 21d and 22d may either be separately inspected or recorded through the facility of the camera 25 or may first be mixed together in a predetermined order and then visually inspected or recorded by means of the recording camera.

As indicated above, the phase or time relationship between the various frequency components of the separately collected signals is not altered or disturbed by compositely recording these signals upon the magnetizable wire 12b. It will be equally apparent that the signal carrier separation and signal resolution is similarly carried out in the various separating channels of the reproducing apparatus 11 without altering the original phase relationship between the collected signals. More specifically, the signals respectively appearing at the output sides of the filters 20d, 21d and 22d bear exactly the same phase relationship one to the other as obtained between the signals during the collection thereof by the pickup devices 13, 14, etc.

One of the problems involved in obtaining useful records of the separately collected signals in their proper time relationship to each other is that of excluding from the camera recorded traces all frequency components except those representing the reflected ground waves, insofar as possible. In other words, it is desirable to prevent noise signal components from being recorded which would prevent detection of the time emphasis between the ground waves separately picked up at different distances from the point of reflection.

In accordance with one feature of the present invention, an entirely novel method of accomplishing this end is provided. This method embraces the steps of repeatedly resolving the composite signal into the separate signals in the manner just explained and of adjusting the band pass filters 20d, 21d and 22d to pass only certain frequency bands of the signals individually impressed thereon until such time as a properly emphasized relationship is observed between the noise and signal frequency components of the signals separately impressed upon the driving elements of the recording camera. In this regard it will be understood that all frequency components of all of the collected signals, including noise as well as the reflected ground wave components, are compositely recorded upon the wire 12b, and compositely reproduced in the channel 19. This of course means that each time the composite signal is reproduced within the channel 19, both the desired and undesired frequency components of each separately collected signal appear at the output side of the separating channel in which the signal is resolved. Thus, the signal voltage appearing at the output side of the amplifier 20c not only contains the desired frequency components representing the reflected ground waves but also contains noise signal components which should be excluded from the finally recorded trace. Under usual conditions of seismic survey, the desired ground wave frequency components will be disposed within a band which is reasonably free from noise. This band may, however, vary widely as between different areas of seismic survey. In any event, separation of this band containing the desired frequency components from the ones in which the noise frequency components are predominant may be readily accomplished by visually reproducing the particular signal at the camera 25 and adjusting the band pass filter 20d, through manipulation of the variable condensers provided therein, until such time as a proper signal characteristic is observed. This necessarily involves repeated reproduction of the original signal in its exact form, a step which is not possible with the systems and methods known to the prior art. In the present improved system, however, this may be readily accomplished by repeatedly reproducing the composite record initially produced upon the magnetizable wire 12b. After each of the band pass filters 20d, 21d, 22d, etc., has been adjusted in the manner just explained, the composite signal carried by the wire 12b may be again reproduced with the camera 25 properly set to perform its intended film recording operation, with the result that the selected frequency components of the signals as determined by the settings of the filters 20d, 21d and 22d are recorded in their original time-relationship upon the camera film 25d.

As indicated above, in many instances it is desirable to mix the individual signals in a predetermined order for the purpose of emphasizing the ratio of reflected energy to other energy. This mixing or feed-over of energy to produce a composite trace upon a record film is well known in the seismic art, although prior practice has dictated that separate shots be fired to produce each set of mixed traces, with the attendant disadvantages pointed out above. It will be apparent, however, that the present invention obviates the necessity for utilizing a shot for each recording operation. Thus, by compositely recording all frequency components of all of the signals upon the magnetizable wire 12b, individual signal traces in their proper phase relation may be produced in the manner explained above, following which and by continued reproduction of the composite signal, the signals may be mixed in the mixing panel 27 to produce mixed traces upon the film 25d during a recording period of the camera 25. In the circuit arrangement illustrated, facilities are provided for mixing the signals respectively appearing at the output sides of the channels 20 and 21 to produce a resultant signal voltage which is impressed across the driving element 25a of the camera 25; for mixing the signals appearing at the output sides of the channels 21 and 22 and impressing the resultant signal upon the driving element 25b of the camera; and for mixing the signal appearing at the output side of the channel 22 with that appearing across the output terminals of a fourth channel, not shown, and for impressing the resultant signal across the driving element 25c of the camera 25. Thus it will be noted that with the relay 50 operated, the signal voltage appearing across the output terminals of the filter 20d is impressed between the cathodes and the upper control grid of the mixing tube 28 through the time delay network 34, while the voltage appearing across the output terminals of the filter 21d is impressed between the cathodes of the tube 28 and the lower control grid of this tube through the time delay network 35. In a similar manner apparent from inspection of the circuit, the tube 29 is connected electronically to mix the signal voltages respectively appearing at the output sides of the filters 21d and 22d. The resultants of the signals electronically mixed within the tubes 28, 29 and 30 are separately impressed across the driving elements 25a, 25b and 25c of the camera 25 through the output transformers 31, 32 and 33, respectively, which are provided with primary windings respectively included in the output circuits of the enumerated mixing tubes.

The character of the mixed signal traces produced upon the film 25d by mixing the signals and then recording fifty percent of the resultants thereof in the manner just explained is well illustrated in Figs. 3B and 3C of the drawings. These two figures and the mixed signal traces respectively illustrated thereby, together with the separate signal traces of Fig. 3A, serve clearly to indicate the novel function of the time delay networks 34, 35 and 36 which are inserted in the signal separating and translating channels between the low frequency band pass filters 20d, 21d, 22d, etc., and the camera 25 when a mixed signal recording or observing operation is to be effected. More specifically, Fig. 3A illustrates the time-relationship between the individually recorded signals which may be separately collected at the different pickup points within the area of survey. As there shown, the large cycles or impulses of the respective traces indicate reflected ground waves. It will be noted, moreover, that this cycle as it appears in trace 21e lags the corresponding cycles of the other four traces by a substantial time interval. This lag may be caused either by greater elevation of the signal pickup device from which the signal is derived or to a greater weathering delay time through the earth's crust at the point where the signal 21e is collected. Regardless of its cause, this delay between the indicated impulse of the reflected wave prevents a proper emphasis as between the reflected wave energy and other energy when this signal is combined with either of the two adjacent signals 20e or 22e. This fact is apparent from a consideration of Fig. 3B wherein the trace 37 is the resultant obtained by mixing the separate signals 20e and 21e and recording one-half of the resultant signal voltage, and the trace 38 is the resultant which is obtained by combining the signals 21e and 22e and recording one-half of the resultant signal voltage. From an inspection of the two curves 37 and 38, it will be noted that the described time lag between the reflected wave impulse of the signal 21e and the corresponding impulses of the signals 20e and 22e decreases the emphasis between this impulse energy and the other energy, when the signals are combined in the described manner. On the other hand, a combination of the signals 22e and 23e to produce the resultant signal trace 39 provides for an accentuation of the emphasis between the reflected signal energy and the other energy. The same form of result may be obtained in combining the signals 20e, 21e and 22e by appropriately and deliberately changing the phase relationship between the signals to wipe out the time delay between the described reflected wave impulse components thereof. This is accomplished by utilizing the time delay networks 34, 35 and 36 and by appropriately adjusting the circuit components of the individual networks until the proper accentuation of the reflected wave impulse components relative to the other components of the combined signals is obtained. This may involve repeated adjustment of the circuit components of two or more of the time delay networks which in turn involves repeated reproduction of the composite signal carried by the magnetizable wire 12b and resolution of this signal into the individual signals. Here again, the desired adjustment of the time delay networks to obtain the proper emphasis between the reflected wave impulse components and the other components of the mixed signal may, if desired, be carried out by utilizing the facilities of the camera 25 to inspect the mixed signals prior to the final recording operation. The results obtained by deliberately wiping out the time delay between the impu'se component of the signal 21e and the corresponding components of the two adjacent signals 20e and 22e is well illustrated in Fig. 3C of the drawings wherein the curve 37' represents pictorially one-half of the resultant of the combined signal voltages 20e and 21e with the time delay between the reflected wave impulse component removed therefrom, and the curve 38' similarly represents one-half of the resultant of the two signals 21e and 22e under the same condition. From an inspection of these two characteristic traces it will be apparent that by removing the described time delay between the reflected wave impulse components of the three signals 20e, 21e and 22e, the relationship between these components and the other signal frequency components is greatly accentuated in the mixed traces 37' and 38'.

It will be apparent from the preceding description that the present improved system provides facilities whereby the signals produced by a single earth disturbing impulse may be studied at will under various and different conditions, all of which contribute to maximum accuracy in analyzing the geological structure of the area under survey. Such analysis is rendered possible by compositely recording all signal components of all of the generated signals upon the magnetizable wire 12b while preserving the exact phase relationship therebetween, thereby to permit repeated resolution of the individual signals without altering the described original phase relationship. This is accomplished, moreover, without any synchronizing problem. Thus, it would be possible to individually record the signals collected by the individual pickup devices concurrently on different recording devices. Under such circumstances, however, undesired duplication of the recording equipment would be required and it would be necessary to maintain a synchronous relationship between the movements of the moving parts of the several recording devices during the recording operation, and to maintain a corresponding synchronous relationship between the movements of the moving parts of the reproducing devices during each reproducing step. In the present improved system, such difficulties are completely obviated by modulating the signals upon carriers which may be readily separated, and continuously recording the carriers upon a single magnetizable wire. In this regard, it will be understood that to facilitate separation of the carriers during the reproducing and resolving steps it is desirable to maintain a substantial frequency separation therebetween. Conventional recording devices employing grooved disks and requiring mechanical translation of the various frequency components of a given signal both during the recording and reproducing steps are not well adapted for use in the present system, for the reason that the recording frequency ranges of such devices are definitely limited not to exceed an upper limit of approximately 20,000 cycles. By employing a magnetic wire recorder of the character described, however, the recording frequency range is in excess of 50,000 cycles, thus providing an adequate band to permit recording of all of the signals while maintaining a wide separation between the carriers upon which these signals are modulated.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. A system for first producing on an elongated magnetizable medium a composite magnetic record of a plurality of phase related seismic signals which are separately collected in the presence of noise at different points, for then separately reproducing the phase related signals in their original phase relationship and for mixing the reproduced signals to produce resultant signals of a predetermined character; which comprises a magnetic recording head for magnetically recording signals on said medium, a plurality of dispersed signal pickup devices operative separatively to pick up said phase related seismic signals and the accompanying noise at said different points, means for separately modulating carriers having different frequencies with said signals and the accompanying noise, a composite signal channel for concurrently impressing the modulated carriers upon said recording head, reproducing means including signal separating channels individually corresponding to said carrier frequencies and each provided with a carrier selective filter followed by a signal and noise demodulator, a mixing network including means for mixing at least two of the demodulated signals to produce a resultant signal, and means included in said signal separating channels at points following said demodulators for preventing at least certain frequency components of the noise from entering said mixing network.

2. A system for first producing on an elongated magnetizable medium a composite magnetic record of a plurality of phase related seismic signals which are separately collected in the presence of noise at different points, for then separately reproducing the phase related signals in their original phase relationship and for mixing the reproduced signals to produce resultant signals of a predetermined character; which comprises a magnetic recording head for magnetically recording signals on said medium, a plurality of dispersed signal pickup devices operative separately to pick up said phase related seismic signals and the accompanying noise at said different points, means for separately modulating carriers having different frequencies with said signals and the accompanying noise, a composite signal channel for concurrently impressing the modulated carriers upon said recording head, reproducing means including signal separating channels individually corresponding to said carrier frequencies and each provided with a carrier selective filter followed by a signal and noise demodulator, a mixing network including means for mixing at least two of the demodulated signals to produce a resultant signal, means included in said signal separating channels at points following said demodulators for preventing at least certain frequency components of the noise from entering said mixing network, and time delay networks included in at least certain of said channels at points following said demodulators to shift the phase relationship between at least certain frequency components of at least certain of the signals entering said mixing network.

3. A system for first producing on an elongated magnetizable medium a composite magnetic record of a plurality of phase related seismic signals which are separately collected at different points, reproducing the phase related signals in their original phase relationship, and mixing the signals to produce resultant signals of a predetermined character; which comprises a magnetic recording head for magnetically recording signals on said medium, a plurality of dispersed signal pick up devices operative separately to pick up said phase related seismic signals at said different points, means for separately modulating carriers of different frequencies with different ones of said signals, a composite signal channel for concurrently impressing the modulated carriers upon said recording head, magnetic reproducing means for reproducing the signals recorded on said medium and including signal separating channels individually corresponding to said carrier frequencies, each of said channels being provided with a carrier selective filter followed by a signal demodulator, a mixing network coupled to said demodulators at the output sides thereof and including means for mixing the demodulated signals from different ones of said channels in pairs to produce predetermined resultant signals, and time delay networks included in said channels at points following said demodulators to change the time relationship between at least certain components of at least certain of the signals entering said mixing network.

4. A system for separately reproducing a plurality of phase related seismic signals which together with noise are separately carried as modulation components on carriers of different carrier frequencies and are compositely recorded on a magnetizable medium and for then mixing at least two of the reproduced seismic signals to produce a predetermined resultant signal; which comprises a magnetic reproducing head for reproducing the composite signal, signal separating channels individually corresponding to said carrier frequencies and commonly coupled to said reproducing head, said channels respectively including carrier selective filters operative to pass different ones of said carriers and followed by signal and noise demodulators, a mixing network including means for mixing at least two of the demodulated signals to produce a resultant signal, and means included in said channels at points following said demodulators for preventing at least certain frequency components of the noise from entering said mixing network.

5. A system for separately reproducing a plurality of phase related seismic signals which together with noise are separately carried as modulation components on carriers of different carrier frequencies and are compositely recorded on a magnetizable medium and for then mixing at least two of the reproduced seismic signals to produce a predetermined resultant signal; which comprises a magnetic reproducing head for reproducing the composite signal, signal separating channels individually corresponding to said carrier frequencies and commonly coupled to said reproducing head, said channels respectively including carrier selective filters operative to pass different ones of said carriers and followed by signal and noise demodulators, a mixing network including means for mixing at least two of the demodulated seismic signals to produce a resultant signal, a time delay network included in at least one of the two channels from which said two mixed seismic signals are derived for changing the time relationship between at least certain frequency components of the mixed signals, and means included in said channels at points following said demodulators for preventing at least certain frequency components of the noise from entering said mixing network.

6. A system for separately reproducing a plurality of phase related seismic signals which are separately carried as modulation components on carriers having different carrier frequencies and are compositely recorded on a magnetizable medium and for then mixing at least two of the reproduced seismic signals to produce a predetermined resultant signal; which comprises a magnetic reproducing head for reproducing the composite signal, signal separating channels individually corresponding to said carrier frequencies and commonly coupled to said reproducing head, said channels respectively including carrier selective filters operative to pass different ones of said carriers and followed by signal and noise demodulators, and a mixing network including means for mixing at least two of the demodulated seismic signals to produce a resultant signal.

7. A system for separately reproducing a plurality of phase related seismic signals which are separately carried as modulation components on carriers having different carrier frequencies and are compositely recorded on a magnetizable medium and for then mixing at least two of the reproduced seismic signals to produce a predetermined resultant signal; which comprises a magnetic reproducing head for reproducing the composite signal, signal separating channels individually corresponding to said carrier frequencies and commonly coupled to said reproducing head, said channels respectively including carrier selective filters operative to pass different ones of said carriers and followed by signal and noise demodulators, a mixing network including means for mixing at least two of the demodulated seismic signals to produce a resultant signal, and a time delay network included in at least one of the two channels from which said two mixed seismic signals are derived for changing the time relationship between at least certain frequency components of the mixed signals.

8. Apparatus for recording and analyzing seismic signals each containing a range of frequencies divisible into bands and generated by a common earth disturbance, which comprises recording means for compositely recording all frequency components of all of said signals upon a common medium from which the signals may be electrically resolved, resolving means for repeatedly and electrically resolving said signals in their entirety from the composite signal recorded on said medium, filter means for separately selecting from the respective signals those frequency components thereof which are disposed within predetermined frequency bands of the respective signal ranges as said composite signal is repeatedly resolved, signal mixing means for mixing the selected components of at least two of said signals during at least one of said resolving steps, and additional recording means for recording at least a part of the resultant of the mixed components upon a second recording medium.

9. Apparatus for producing a permanent record of only certain desired frequency components of seismic signals generated by a common earth disturbance and each containing other frequency components, which comprises recording means for compositely recording all frequency components of all of said signals upon a common medium from which the signals making up the composite signal may be electrically resolved, resolving means for electrically resolving said signals in their entirety from the composite signal recorded on said medium, filter means for selecting said certain desired frequency components of each signal as said electrical resolution of the composite signal proceeds, mixing means for mixing the selected components of different pairs of said signals, additional recording means for separately recording at least parts of the resultant of the mixed components of said different pairs of signals upon a common recording medium, and delay means for delaying the mixing of at least one of said signals with the other signals, thereby to emphasize certain components of the resultant derived from said one signal.

JAMES E. HAWKINS.

REFERENCES CITED

The following references are of record in the file of this patent:

UNITED STATES PATENTS

| Number | Name | Date |
|---|---|---|
| 1,910,254 | Keller | May 23, 1933 |
| 2,105,318 | Goldsmith | Jan. 11, 1938 |
| 2,151,878 | Weatherby | Mar. 28, 1939 |
| 2,156,198 | Scherbatskoy | Apr. 25, 1939 |
| 2,156,624 | Faust | May 2, 1939 |
| 2,167,124 | Minton | July 25, 1939 |
| 2,184,313 | Owen | Dec. 26, 1939 |
| 2,191,121 | Slichter | Feb. 20, 1940 |
| 2,192,972 | Innes | Mar. 12, 1940 |
| 2,202,885 | Zuschlag | June 4, 1940 |
| 2,360,507 | Minton | Oct. 17, 1944 |
| 2,394,990 | Eisler et al. | Feb. 19, 1946 |
| 2,427,421 | Rieber | Sept. 16, 1947 |